March 28, 1933. O. MITCHELL 1,903,060
SHAFT MOUNTING FOR ROTATABLE CYLINDERS
Filed June 18, 1931 2 Sheets-Sheet 1
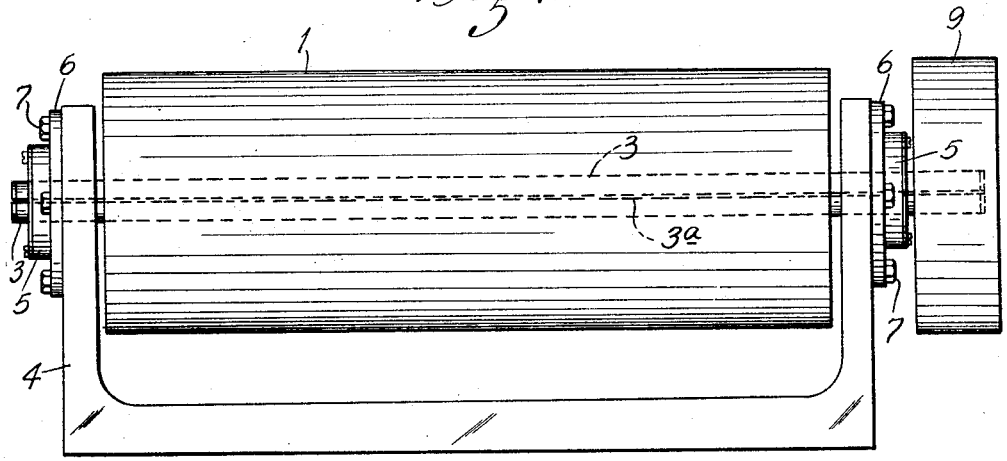
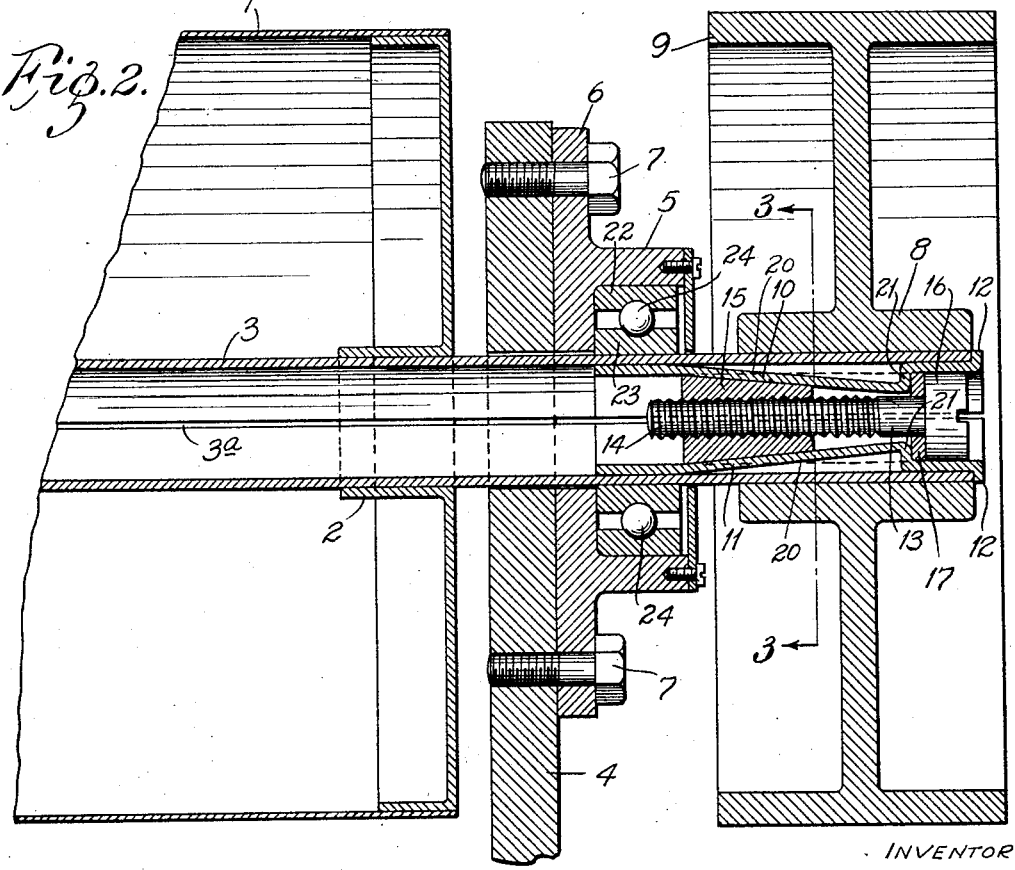
INVENTOR:
ORVILLE MITCHELL
BY Bruce S. Elliott
ATTORNEY.

March 28, 1933.    O. MITCHELL    1,903,060
SHAFT MOUNTING FOR ROTATABLE CYLINDERS
Filed June 18, 1931    2 Sheets-Sheet 2
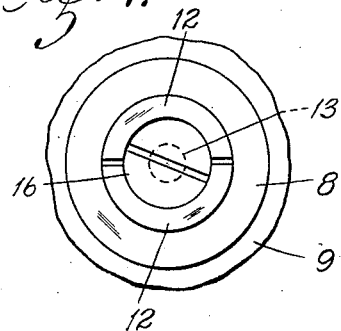
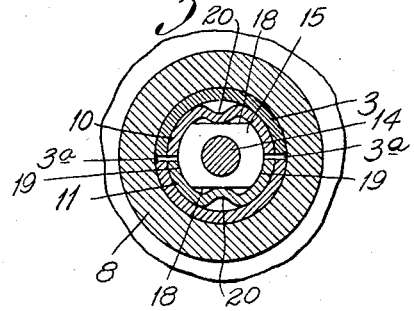
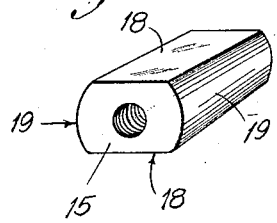
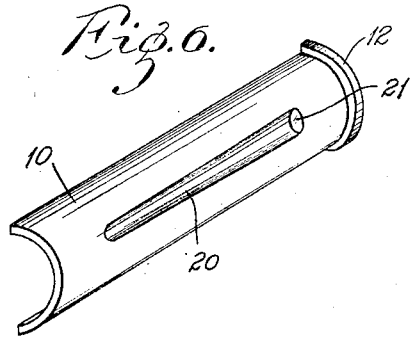
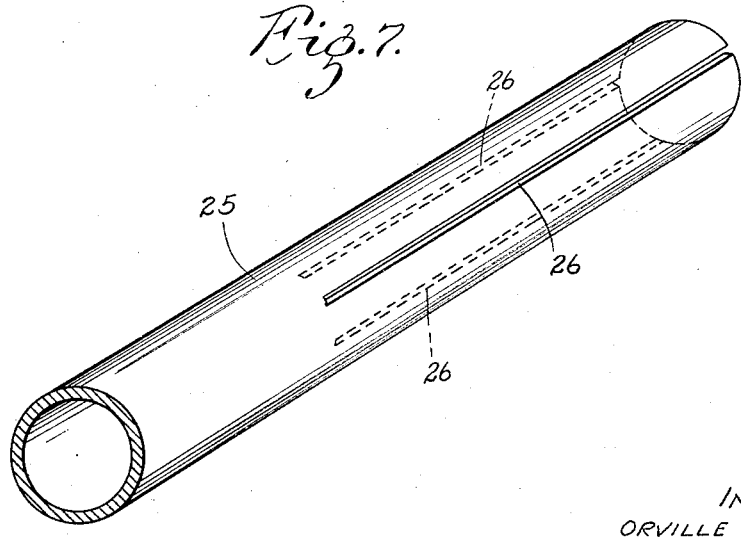
INVENTOR:
ORVILLE MITCHELL
By Bruce S. Elliott
ATTORNEY.

Patented Mar. 28, 1933

1,903,060

UNITED STATES PATENT OFFICE

ORVILLE MITCHELL, OF DALLAS, TEXAS

SHAFT MOUNTING FOR ROTATABLE CYLINDERS

Application filed June 18, 1931. Serial No. 545,218.

This invention relates to the provision of novel means for securing the shaft of a rotatable member, such as a cylinder, to the bearings or driving element, or both, for such shaft.

The invention has for its general object to simplify the construction, to lessen the weight of parts, and to reduce the cost involved in the mounting and driving of such shafts as compared with the conventional means employed for this purpose.

With the above general objects in view, my invention consists, essentially, as to the entire combination involved, of a cylinder, or other similar rotatable member, secured on a hollow or tubular shaft provided in its ends with one or more slits; frictionless bearings, such as ball or roller bearings, mounted on the slitted ends of the shaft, the inner race of such bearings being in engagement with the shaft; a driving member mounted on the end of the shaft; and expansible members inserted in, and manipulated to expand the ends of said shaft, whereby the latter will be forced into firm engagement with the inner races of the bearings at both its ends, and at one end also with the wall of the pulley, sprocket, or gear mounted on such shaft for driving it.

The invention also consists, in one of its details, in a novel construction of expansible member for use in a hollow split shaft, or a hollow shaft having a split end, whereby said shaft may be expanded into firm engagement with any element, such as the inner race of a bearing, or the hub of a pulley, gear, sprocket, or the like, mounted on the end of said shaft.

The invention is illustrated in the accompanying drawings, in which:

Figure 1 is a view in elevation showing a cylinder rigidly secured on a split tubular shaft, the latter being mounted in bearings, and provided at one end with a drive pulley, the view illustrating the general combination involved in my invention.

Figure 2 is a longitudinal sectional view on an enlarged scale of the construction illustrated at the right hand end of Figure 1, and showing one end of the cylinder rigidly secured to a central split tubular shaft which projects beyond the end of the cylinder and is secured to the inner race of a ball bearing and to a driving pulley, according to my invention;

Figure 3 is a sectional view taken on the line 3—3 of Figure 2 and viewed in the direction of the arrows;

Figure 4 is an end view looking to the left of Figure 1;

Figure 5 is a perspective view of the traveling nut for forcing apart the two halves of the expansible element;

Figure 6 is a perspective view of one member, or half, of the expansible element; and Figure 7 is a perspective view of a modified construction of the shaft.

Referring now to the drawings, the numeral 1 indicates a cylinder, representative of any rotatable element to be secured on and rotatable with a central shaft and, usually, to be rotated by said shaft. The cylinder 1 is shown as being hollow and is rigidly secured at its ends at 2 to a split tubular shaft 3, the split being shown at 3ª, and the ends of which project beyond the ends of the cylinder. At one end, that at the left of Figure 1, the shaft projects only a sufficient distance to extend through a standard 4 and through a ball bearing 5 having a flanged base 6, which is secured, as indicated at 7, to the upper end of the standard 4. If the shaft 3 is to be driven, one of its ends is projected a sufficient distance beyond the bearing 5 to permit of having mounted thereon the hub 8 of a pulley 9, or similar driving element, such as a gear or a sprocket. To secure the shaft to the inner race of the ball bearing and to the hub of the pulley, I employ the improved means now to be described.

The numerals 10, 11, indicate, respectively, the two halves of a cylindrical expanding member 12 having an outside diameter practically the same as the inside diameter of the tubular shaft, and provided at its outer end with a flange 12 to limit the distance to which the expansible member can be inserted into the projecting end portion of the tubular shaft. The length of the expansible member will vary in application but, roughly speaking, it is substantially of the same length as the length of the portion of the shaft projecting beyond the cylinder. For example, where the shaft, as at the right of Figures 1 and 2, projects beyond the drum a distance sufficient to pass through a roller bearing assembly and the hub of a pulley, the expansible member will be of a length to extend from the outer end of the shaft under the inner race of the bearing. If, as shown at the left of Figure 1, the projecting end of the shaft is adapted to be mounted in a bearing assembly only, then, of course, the expansible member would be shorter than the one employed at the right of Figure 1, as in this case, its inner end has only to pass through the inner race of the bearing. The numeral 13 indicates an adjusting screw, having a threaded portion 14 engaging in an internally screw-threaded, tapered nut 15, and a head 16, the inner side of which bears against a washer 17 inserted in the end of the expansible member. While the nut 15 in longitudinal section is conical on any plane of section, in cross section, as indicated in Figure 3, it has two opposite flat sides 18, and two opposite curved sides 19, the curvature and taper of which correspond with the curvature and taper of the walls of the two halves 10 and 11 of the expansible member. As shown by Figure 3, each of the members 10 and 11 is centrally corrugated or indented longitudinally to provide a tapered ridge, or locking member 20, which ridges engage the flat sides 18 of the nut 15 and prevent the latter from turning. These ridges terminate short of the opposite ends of the members 10, 11, and at their outer ends form shoulders 21 which serve as seats for the washer 17, previously referred to.

The bearing, indicated generally by 5, has, as usual, an outer race 22, inner race 23 and interposed balls 24.

From the above description, it will be seen that with the bearing and pulley inserted on one end of the split shaft 3, and my improved expansible member inserted in the end of the shaft with the flange 12 resting against the outer end of the shaft, when the adjusting screw 13 is turned clock-wise with an ordinary screw driver, the nut 15 will be moved outward, its tapered curved sides engaging the walls of the members 10, 11, and its flat sides the tapered ridges 20, and forcing said members apart, whereby practically all of that portion of the shaft 3 projecting beyond the cylinder will be expanded and forced into firm engagement with the inner race 23 of the bearing and the hub 8 of the pulley or other driving member. The engagement can be effected rapidly, is perfectly rigid, and does not involve any mutilation of the surface of the shaft. By unscrewing the adjusting screws 16, and permitting the expansible members to collapse, the pulley and bearings can be readily removed from the shaft and as readily replaced and again secured in position.

An important feature of my invention is the fact that I use a split tubular shaft, or a hollow shaft with split ends, in place of a solid shaft. When a solid shaft is used as the axis for rotating cylinders, the bearings supporting each end of the shaft, either of the ball or roller type, must have their inner races secured to the shaft by the use of more or less complicated parts, which are expensive to machine. If securing members are inserted between the inner race and the shaft, which is a common practice, the bearing as a whole must be made much larger than would otherwise be required, in order to provide space for such securing members. Furthermore, the pulley, gear or sprocket wheel mounted for driving on that end portion of the shaft extending through one of the bearings, must be either set-screwed, keyed, or otherwise secured to the shaft for the purpose of driving the cylinder, and the means employed is either expensive, or, if set screws are used, the shaft is burred to such an extent as to make it difficult to remove and replace the driving member.

While not limited in application, my invention is more particularly intended for use in mounting the various cylinders used in cotton feeding, cleaning and extracting machines, and I have found that for such application a solid shaft is unnecessary, as the drum or cylinder itself provides the necessary strength to enable a hollow shaft to resist torsional strain when the cylinder is secured rigidly to the shaft.

By having the shaft of the rotating cylinder of tubular construction, and provided with one or more slits in that portion of the shaft projecting beyond the ends of the cylinder, and extended through the inner races of the bearings and the hub of the pulley or other means for driving the cylinder, it becomes a simple matter to insert into the ends of the tubular shaft expansible members for expanding the shaft to cause it to grip the inner races of the bearings and the hub of the driving member. I thus avoid the necessity for the use of set screws or other means for securing either the inner races of the bearings or the hubs of the pulleys to the shaft of the cylinder.

I prefer the use of split tubular shafts, as illustrated in the drawings. It will be obvious, however, to those skilled in the art that I could employ a continuous tubular shaft and provide the same with one or more slits in the end portions only. In the interest of a complete disclosure of the invention, I show such a modified construction in Figure 6, in which the numeral 25 indicates a continuous tubular shaft provided at opposite ends with a plurality of slits 26 of the desired length.

It will also be obvious that additional slits can be provided in the ends of the split tubular shaft shown in Figure 1, if desired.

I claim:—

1. In combination with a tube having a split end, means for expanding the end portion of the tube into binding engagement with a surrounding body, comprising a cylindrical member in two parts inserted in the end of said tube having substantially the diameter of the bore of said tube, at its outer end having a flange engaging the outer end of said tube, and near its outer end having an interior seat, each of said parts having an interior tapered surface, a nut tapered to engage the tapered surfaces of said member, and a screw engaging said nut and having a head mounted in the end of said member and engaging the seat thereof.

2. In combination with a tube having a split end, means for expanding the end portion of the tube into binding engagement with a surrounding body, comprising a cylindrical member in two parts inserted in the end of said tube having substantially the diameter of the bore of said tube, each of said parts being longitudinally corrugated to provide an interior tapered ridge, a tapered nut engaging the wall of said member and provided with opposite flat, tapered sides engaging said ridges, and a screw engaging said nut having a head engaging the end portion of said member.

3. In combination with a tube having a split end, means for expanding the end portion of the tube into binding engagement with a surrounding body, comprising a cylindrical member in two parts inserted in the end of said tube having substantially the diameter of the bore of said tube, each of said parts being longitudinally corrugated to provide an interior tapered ridge, a tapered nut engaging the wall of said member and provided with opposite flat, tapered sides engaging said tapered ridges, and a screw engaging said nut and having a head engaging shoulders formed by the outer ends of said corrugations.

4. In combination with a hollow shaft having a split end portion, a frictionless bearing having an inner race mounted on the split end portion of said shaft, a driving member having a hub also mounted on the split end of said shaft, expansible members inserted in the split end of said shaft, and means for expanding said members to cause the split portions of the shaft to be bound simultaneously in engagement with the inner race of said bearing and the hub of said driving member.

5. In combination with a split tubular shaft, bearings having inner races surrounding said shaft, a drive pulley having a hub mounted on one end of said shaft, an expansible member inserted in each end of said shaft and means for expanding each of said members to cause said ends to bind in engagement with the inner race of one of said bearings and simultaneously with the inner race of the other bearing and the inner wall of the hub of said pulley, respectively.

In testimony whereof, I have hereunto set my hand.

ORVILLE MITCHELL.